(12) United States Patent
Akashi

(10) Patent No.: US 10,766,309 B2
(45) Date of Patent: Sep. 8, 2020

(54) PNEUMATIC TIRE

(71) Applicant: The Yokohama Rubber Co., LTD., Minato-ku, Tokyo (JP)

(72) Inventor: Yasutaka Akashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 375 days.

(21) Appl. No.: 15/551,581

(22) PCT Filed: Feb. 9, 2016

(86) PCT No.: PCT/JP2016/053834
§ 371 (c)(1),
(2) Date: Aug. 16, 2017

(87) PCT Pub. No.: WO2016/132971
PCT Pub. Date: Aug. 25, 2016

(65) Prior Publication Data
US 2018/0043737 A1     Feb. 15, 2018

(30) Foreign Application Priority Data

Feb. 16, 2015   (JP) .................................. 2015-027556

(51) Int. Cl.
*B60C 11/01* (2006.01)
*B60C 11/11* (2006.01)
(Continued)

(52) U.S. Cl.
CPC ............... *B60C 11/01* (2013.01); *B60C 11/03* (2013.01); *B60C 11/0306* (2013.01);
(Continued)

(58) Field of Classification Search
CPC ....... B60C 11/01; B60C 11/11; B60C 11/0306
See application file for complete search history.

(56) References Cited

U.S. PATENT DOCUMENTS 5,571,351 A * 11/1996 Hatakenaka ............ B60C 11/01
152/209.16
6,340,040 B1 * 1/2002 Ikeda .................. B60C 11/0306
152/209.18
(Continued)

FOREIGN PATENT DOCUMENTS

CN           1803479        7/2006
JP         2003-211915      7/2003
(Continued)

OTHER PUBLICATIONS

Machine translation for Japan 2008-155685 (Year: 2019).*
International Search Report for International Application No. PCT/JP2016/053834 dated Apr. 5, 2016, 4 pages, Japan.

*Primary Examiner* — Steven D Maki
(74) *Attorney, Agent, or Firm* — Thorpe North & Western

(57) ABSTRACT

A pneumatic tire includes main grooves disposed in shoulder regions of a tread portion and extending in a tire circumferential direction; a plurality of lug grooves extending outward in a tire width direction from the main grooves and reaching sidewall portions; and a plurality of blocks that is partitioned by the main grooves and the lug grooves. In such a pneumatic tire, a narrow-width bent portion, having a groove width that is less than a groove width of other portions of the lug groove and which is bent with respect to an extending direction of the lug groove, is provided at an end portion on an outer side in the tire width direction of at least a portion of lug grooves among the plurality of lug grooves.

8 Claims, 5 Drawing Sheets

(51) Int. Cl.
 *B60C 11/03* (2006.01)
 *B60C 11/12* (2006.01)

(52) U.S. Cl.
 CPC .......... *B60C 11/11* (2013.01); *B60C 11/1204* (2013.01); *B60C 2011/1213* (2013.01)

(56) References Cited

U.S. PATENT DOCUMENTS

| | | | |
|---|---|---|---|
| 2004/0020577 A1 | 2/2004 | Hirai | |
| 2010/0043934 A1 | 2/2010 | Harvey | |
| 2011/0120609 A1* | 5/2011 | Nakamura | B60C 11/0302 |
| | | | 152/209.18 |
| 2012/0067478 A1* | 3/2012 | Sato | B60C 11/01 |
| | | | 152/209.16 |
| 2019/0016179 A1* | 1/2019 | Yamakawa | B60C 11/1236 |

FOREIGN PATENT DOCUMENTS

| | | | |
|---|---|---|---|
| JP | 2004-058839 | | 2/2004 |
| JP | 2006-192959 | | 7/2006 |
| JP | 2007-161135 | | 6/2007 |
| JP | 2008-155685 A | * | 7/2008 |
| JP | 2010-047251 | | 3/2010 |
| JP | 2011-183884 | | 9/2011 |
| JP | 2013-049325 | | 3/2013 |

* cited by examiner

PNEUMATIC TIRE

TECHNICAL FIELD

The present technology relates to a pneumatic tire, and particularly relates to a pneumatic tire whereby superior driving performance on muddy ground, snowy roads, sandy land, and the like can be obtained.

BACKGROUND ART

Typically, a tread pattern based on lug grooves with many edge components, for which groove area and groove depth is great is used for pneumatic tires to be used for traveling on muddy ground, snowy roads, sandy land, and the like (hereinafter referred to as "muddy ground and the like"). Such tires seek to bite into the mud, snow, sand, or the like (hereinafter referred to as "mud and the like") on the road surface to obtain traction performance and also prevent mud and the like from forming a clog in the grooves (improve discharging performance of mud and the like) in order to improve driving performance (mud performance) on muddy ground and the like (e.g. see Japanese Unexamined Patent Application Publication No. 2011-183884A).

The technology described in Japanese Unexamined Patent Application Publication No. 2011-183884A calls particular attention to the sinking in of a region from the shoulder portion to the sidewall portion in mud and the like when traveling on muddy ground and the like, and describes opening a lug groove extending outward in the tire width direction in the shoulder portion past the shoulder portion and up to the sidewall portion, and also increasing the groove width of this lug groove as going outward in the tire width direction. With such a tire, mud performance can be further improved when traveling on muddy ground and the like due to the lug groove extending outward in the tire width direction past the shoulder portion.

However, with lug grooves shaped in this manner, discharge performance of mud and the like is obtained by increasing the groove width as going outward in the tire width direction. As such, it is more difficult for mud and the like to be compacted in the lug grooves, which leads to a problem of traction characteristics, which are generated by shear force against the mud and the like compacted in the lug groove, being insufficient. Consequently, there is a problem in that high traction characteristics cannot be obtained in cases where rapid take off is required, and particularly, in situations such as when the tire has gotten into deep muddy ground and the like.

SUMMARY

The present technology provides a pneumatic tire whereby superior driving performance on muddy ground, snowy roads, sandy land, and the like can be obtained.

A pneumatic tire of the present technology includes a tread portion extending in a tire circumferential direction to form an annular shape; a pair of sidewall portions disposed on both sides of the tread portion; a pair of bead portions disposed inward in a tire radial direction of the sidewall portions; main grooves disposed in shoulder regions of the tread portion and extending in the tire circumferential direction; a plurality of lug grooves extending outward in a tire width direction from the main grooves and reaching the sidewall portions; and a plurality of blocks partitioned by the main grooves and the lug grooves. In such a pneumatic tire, a narrow-width bent portion, having a groove width that is less than a groove width of other portions of the lug groove and which is bent with respect to an extending direction of the lug groove, is provided at an end portion outward in the tire width direction of at least a portion of lug grooves among the plurality of lug grooves.

According to the present technology, not only is mud and the like bit into by the lug grooves that extend from the main grooves disposed in the shoulder regions and reach the sidewall portions, but also the discharging outward in the tire width direction of mud and the like that has gotten into the lug grooves is suppressed by the narrow-width bent portion provided at the end portion outward in the tire width direction of at least a portion of the lug grooves. Thus, the mud and the like in the lug grooves can be compacted more easily. As a result, traction characteristics based on the shear force against compacted mud and the like can be satisfactorily obtained.

In the present technology, it is preferable that an uneven portion that has a step-like shape is provided in a portion of blocks positioned on both sides in the tire circumferential direction of the lug grooves including the narrow-width bent portion, the uneven portion undulating along a top surface of each of the blocks. By providing such an uneven portion, mud and the like that forms a clog in the lug grooves can be effectively discharged via the uneven portion during normal travel, and discharging performance of mud and the like can be improved.

In the present technology, it is preferable that the lug grooves including the narrow-width bent portion and lug grooves not including the narrow-width bent portion are alternately disposed along the tire circumferential direction. As a result of this configuration, lug grooves that have sufficient groove width up to the end portion outward in the tire width direction and have excellent discharging performance of mud and the like, and lug grooves that have excellent traction characteristics based on shear force against compacted mud and the like as a result of including the narrow-width bent portion are disposed equally in the tire circumferential direction. Thus, these performance factors can be achieved in a well-balanced manner and tire performance matching the situation when traveling can be effectively demonstrated.

In the present technology, it is preferable that, when viewing the lug groove including the narrow-width bent portion from a tire equator side, a ratio Wb/Wa of a groove width Wb of the narrow-width bent portion to a groove width Wa of the lug groove at a starting position of the narrow-width bent portion is from 0.15 to 0.50. By configuring the groove width of the narrow-width bent portion with respect to that of portions other than the narrow-width bent portion in this manner, discharging performance of mud and the like by the narrow-width bent portion and traction characteristics based on shear force against compacted mud and the like can be achieved in a well-balanced manner.

In the present technology, it is preferable that a ratio A/H of a vertical distance A measured along the tire radial direction from a ground contact edge position of the tread portion to the narrow-width bent portion, to a tire cross-sectional height H is from 0.15 to 0.30. By disposing the narrow-width bent portion in this manner, the mud and the like on the road surface will reliably contact up to the narrow-width bent portion when traveling on muddy ground and the like. As such, the advantageous effects of the narrow-width bent portion can be sufficiently demonstrated.

In the present technology, it is preferable that at least one cavity for which surroundings are obstructed is provided in the blocks. By providing such a cavity, mud and the like will be trapped by the cavity and, also, the mud and the like in the cavity can be compacted. As such, traction characteristics can be further improved.

In the present technology, the "ground contact edge" is the edge portion in the tire axial direction when the tire is mounted on a regular rim and inflated to an air pressure of 230 kPa, and placed vertically upon a flat surface with 60% of a regular load applied thereto. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular load" is a load defined by a standard for each tire according to a system of standards that includes standards on which tires are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO.

DETAILED DESCRIPTION

The configuration of the present technology is described below in detail with reference to the accompanying drawings.

Figure 1:
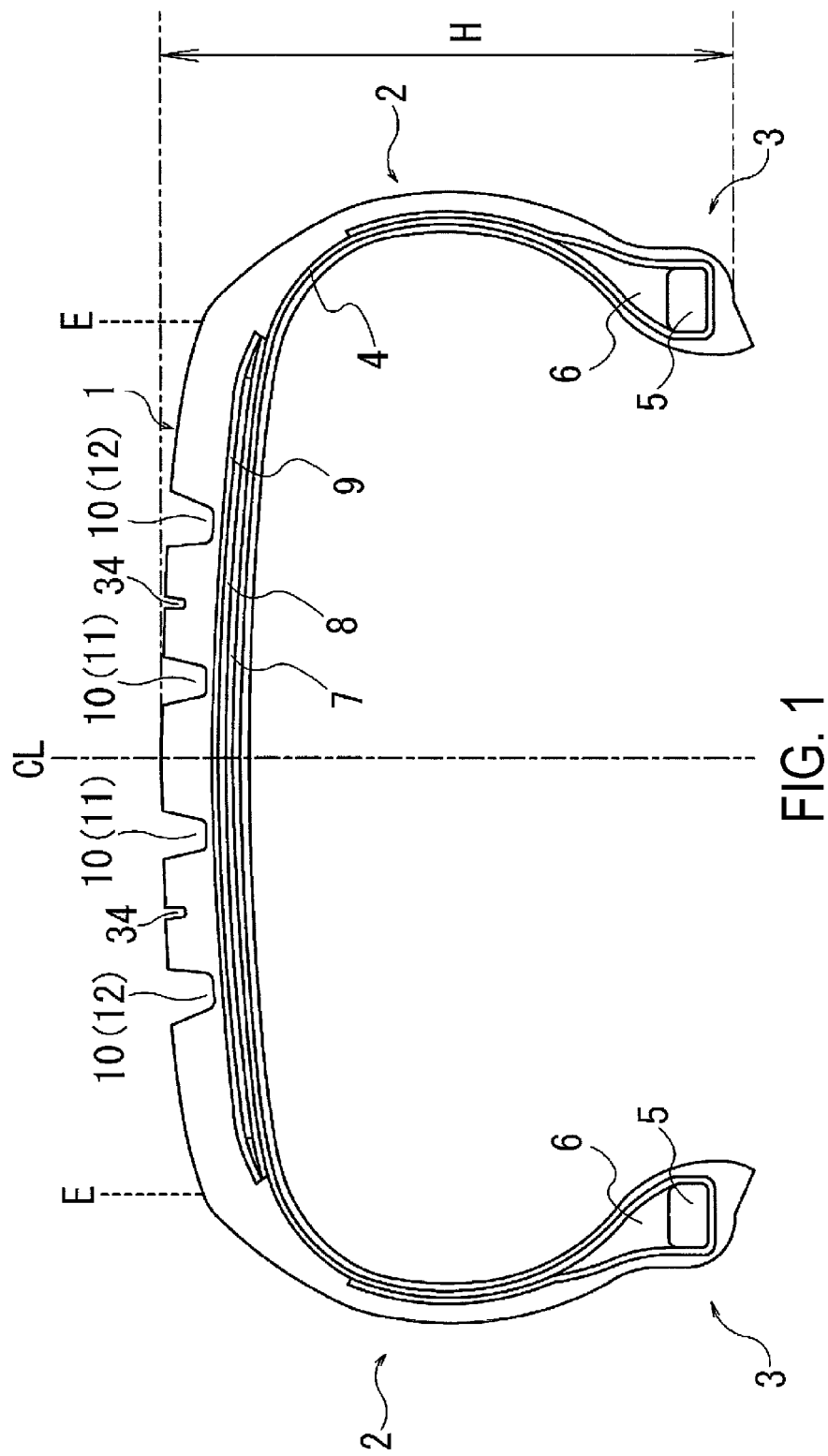
FIG. 1 is a meridian cross-sectional view of a pneumatic tire according to an embodiment of the present technology.

Reference sign CL in FIG. 1 denotes the tire equator. The pneumatic tire of the present technology includes a tread portion 1 extending in a tire circumferential direction to form an annular shape, a pair of sidewall portions 2 disposed on both sides of the tread portion 1, and a pair of bead portions 3 disposed inward in a tire radial direction of the sidewall portions 2. One layer of a carcass layer 4 is disposed extending between the left and right pair of bead portions 3. The carcass layer 4 includes a plurality of reinforcing cords extending in the tire radial direction, and is folded back around a bead core 5 disposed in each bead portion 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. In the tread portion 1, a plurality of belt layers 7 and 8 (two layers in FIG. 1) are embedded on the outer circumferential side of the carcass layer 4. Each of the belt layers 7 and 8 includes a plurality of reinforcing cords inclined with respect to the tire circumferential direction, and these reinforcing cords are arranged so that the cords of different layers intersect each other. In the belt layers 7 and 8, an inclination angle of the reinforcing cords with respect to the tire circumferential direction is set in a range of, for example, 10° to 40°. Additionally, a belt reinforcing layer 9 is disposed on the outer circumferential side of the belt layer 7, 8. The belt reinforcing layer 9 includes organic fiber cords oriented in the tire circumferential direction. In the belt reinforcing layer 9, an angle of the organic fiber cords with respect to the tire circumferential direction is set to, for example, 0° to 5°.

The present technology is applied to such a general pneumatic tire, however, the cross-sectional structure thereof is not limited to the basic structure described above.

Figure 2:
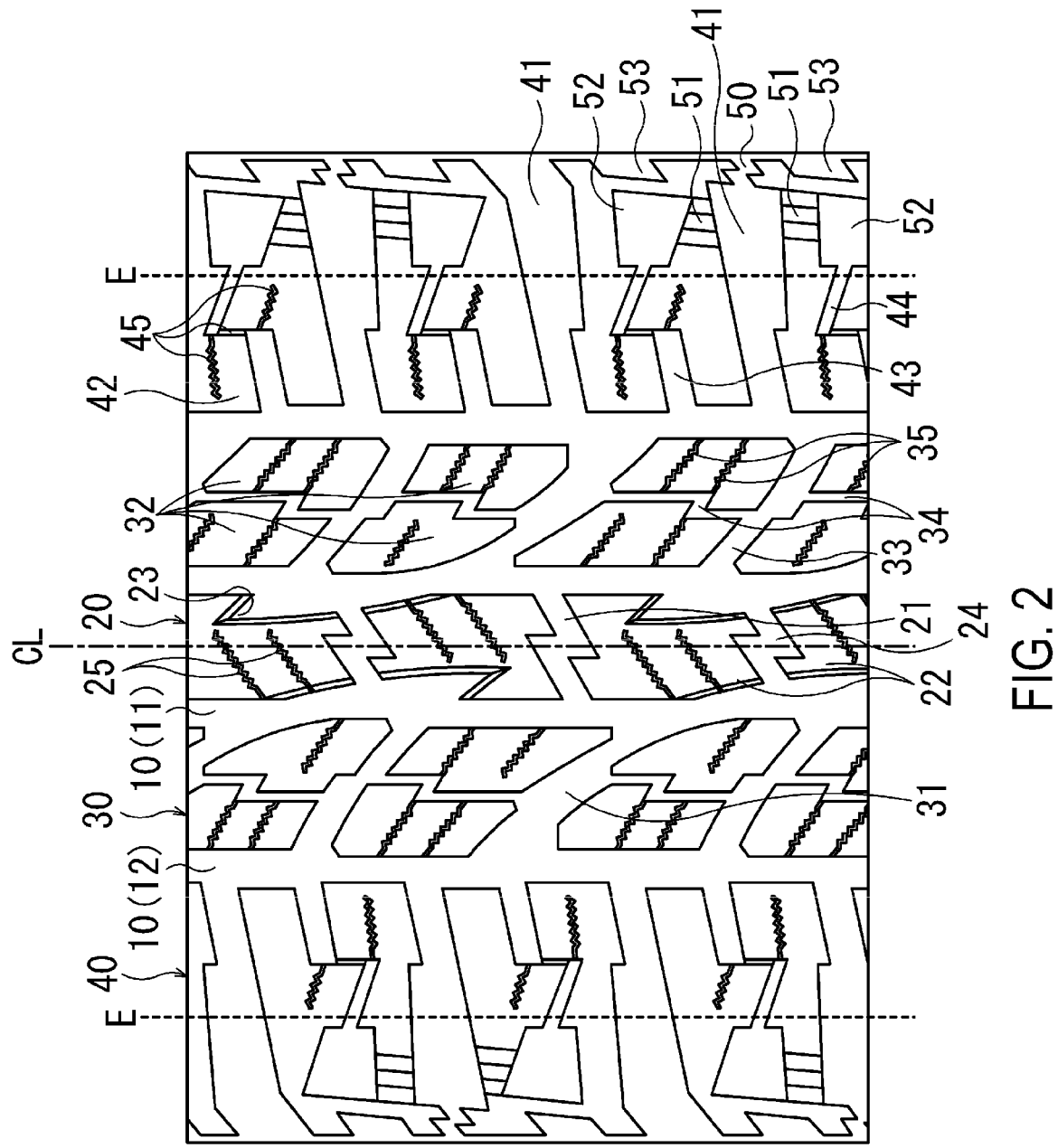
FIG. 2 is a front view illustrating a tread surface of a pneumatic tire according to an embodiment of the present technology.

Four main grooves 10 extending in the tire circumferential direction are formed in the tread portion 1 of the embodiment illustrated in FIG. 2. Of these four main grooves 10, the main grooves 10 disposed on the tire equator CL side on both sides in the tire width direction of the tire equator CL are defined as inner main grooves 11, and the main grooves 10 disposed outward in the tire width direction (on the shoulder portion side) of the inner main grooves 11 are defined as outer main grooves 12.

Five rows of land portions extending in the tire circumferential direction are partitioned in the tread portion 1 by these four main grooves 10. Of these five land portions, the land portion partitioned between the two inner main grooves 11 is defined as a central land portion 20, the land portions partitioned between each of the inner main grooves 11 and the outer main grooves 12 are defined as intermediate land portions 30, and the land portions partitioned outward in the tire width direction from the outer main grooves 12 are defined as shoulder land portions 40.

A plurality of central lug grooves 21 is provided in the central land portion 20, spaced in the tire circumferential direction. The plurality of central lug grooves 21 communicate with the inner main grooves 11 on both sides of the central land portion 20. Each of the central lug grooves 21 has a zigzag shape, and is configured from a first portion extending in the tire circumferential direction, a second portion extending from a first end of the first portion toward the main groove on a first side in the tire width direction, and a third portion extending from a second end of the first portion toward the main groove on a second side in the tire width direction. Here, the first portion extending in the tire circumferential direction of each central lug groove 21 is positioned on the tire equator CL. Additionally, the second and third portions extending in the tire width direction of each central lug groove 21 are both inclined in the same direction with respect to the tire width direction, and inclination angles of the second and third portions are identical.

Thus, the central land portion 20 is divided by the central lug grooves 21 into a plurality of central blocks 22 arranged in the tire circumferential direction. A recessed portion 23 is formed in wall surfaces (wall surfaces facing the inner main grooves 11) on both sides in the tire width direction of each central block 22. Each recessed portion 23 has a V-shaped form, notched toward the tire equator CL side. A chamfer is formed at a connecting portion of the wall surface of each recessed portion 23 with a top surface of the central block 22. A central auxiliary groove 24 connecting the two recessed portions 23 formed in each central block 22 is formed between these two recessed portions 23. Each central auxiliary groove 24 opens to a midsection of the wall surface leading to the apex of the V-shaped recessed portion 23. Additionally, each central auxiliary groove 24 has a bent shape similar to that of the central lug grooves 21. Specifically, while the central auxiliary grooves 24 are inclined in the same direction as the central lug grooves 21, a groove width of the central lug grooves 21 is smaller than a groove width of the central auxiliary grooves 24.

A plurality of sipes 25 extending in the tire width direction is provided in each portion of the central blocks 22 that are divided by the central auxiliary grooves 24. These sipes 25 have a zigzag shape in the top surface of the central blocks 22. Additionally, each sipe 25 is configured such that a first end communicates with the inner main groove 11, and a second end terminates near the tip of the V-shaped recessed portion 23 described above.

Pluralities of intermediate lug grooves 31 extending in the tire width direction and spaced in the tire circumferential direction are provided in the intermediate land portions 30. Each intermediate lug groove 31 is inclined with respect to the tire width direction and is curved in an arc shape convex to the tire equator CL side. Note that the groove width of each intermediate lug groove 31 need not be constant and, as illustrated in the drawings, the groove width may change in a step-like manner.

The intermediate land portions 30 are divided by the intermediate lug grooves 31 into pluralities of intermediate blocks 32 arranged in the tire circumferential direction. Each intermediate block 32 is further partitioned by an intermediate auxiliary groove 33 extending in the tire width direction and a circumferential auxiliary groove 34 extending in the tire circumferential direction. The groove width of the intermediate auxiliary groove 33 changes at a central portion in the width direction of the intermediate block 32 and includes a broad width portion and a narrow width portion. The circumferential auxiliary groove 34 has a zigzag shape and communicates with the broad width portion of the intermediate auxiliary groove 33 and the intermediate lug groove 31. A wall surface (wall surface facing the main groove) of each portion of the intermediate block 32, which is divided by the intermediate auxiliary groove 33 and the circumferential auxiliary groove 34, is offset in the tire width direction for each portion, and is configured such that, when viewed in the tire circumferential direction, unevennesses repeat in a groove wall surface on the intermediate land portion 30 side of each main groove.

At least one sipe 35 is provided in each portion of the intermediate block 32, which is divided by the intermediate auxiliary groove 33 and the circumferential auxiliary groove 34. Each sipe 35 has a zigzag shape in the block top surface. Both ends of the sipes 35, which are formed in the portion on the inner main groove 11 side of the divided portions of the intermediate block 32, and that are present at a position facing the inner circumference of the arc of the intermediate lug groove 31, terminate within the intermediate block 32 (within the divided portion of the intermediate block 32). A first end of the sipes 35, which are formed in the portion on the inner main groove 11 side of the divided portions of the intermediate block 32, and that are present at a position facing the outer circumference of the arc of the intermediate lug groove 31, opens to the inner main groove 11 and a second end thereof is open to or terminates within the circumferential auxiliary groove 34. A first end of the sipes 35, which are formed in the portions on the outer main groove 12 side of the divided portions of the intermediate block 32, opens to the outer main groove 12 and a second end thereof is open to the circumferential auxiliary groove 34. As illustrated in the drawings, the sipes 35 that open to the circumferential auxiliary groove 34 can be opened to the bent-back portion of the zigzag shape of the circumferential auxiliary groove 34.

Note that, in the example illustrated in the drawings, the V-shaped recessed portions 23 formed in the central land portions 20 described above are configured so as to match an acute portion formed by connecting an extension line of the intermediate lug groove 31 and an extension line of the intermediate auxiliary groove 33 formed in the intermediate land portion 30.

Pluralities of shoulder lug grooves 41 extending in the tire width direction and spaced in the tire circumferential direction are provided in the shoulder land portions 40. The shoulder lug grooves 41 extend outward in the tire width direction from the outer main grooves 12 and reach the sidewall portions. The shoulder lug grooves 41 are configured such that a groove width thereof gradually increases outward in the tire width direction. Note that, in the example illustrated in the drawings, each shoulder lug groove 41 includes one portion where the groove width increases in a step-like manner, in a region (ground contact region) inward in the tire width direction of a ground contact edge E.

The shoulder land portions are divided by these pluralities of shoulder lug grooves 41 into pluralities of shoulder blocks 42 arranged in the tire circumferential direction. Two types of shoulder auxiliary grooves (a first shoulder auxiliary groove 43 and a second shoulder auxiliary groove 44) extending in the tire width direction are formed in each shoulder block 42. The first shoulder auxiliary groove 43 has a shape in which a first end communicates with the outer main groove 12 and a second end terminates within the shoulder block 42. The second shoulder auxiliary groove 44 has a shape in which a first end terminates within the shoulder block 42 and a second end extends past the ground contact edge E. The groove wall surfaces facing the outer main groove 12 of the portions of the shoulder block 42, which is divided by the first shoulder auxiliary groove 43, are offset in the tire width direction.

Terminating positions within the shoulder block 42 of the first shoulder auxiliary groove 43 and the second shoulder auxiliary groove 44 are aligned in the tire width direction, and these terminating ends are connected by a sipe 45 extending in a straight line in the tire circumferential direction. Furthermore, a straight line shaped sipe 45 extending from the terminating end of the first shoulder auxiliary groove 43 along an extending direction of the first shoulder auxiliary groove 43, and a zigzag shaped sipe 45 extending from the terminating end of the second shoulder auxiliary groove 44 along the extending direction of the second shoulder auxiliary groove 44 are provided in the shoulder block 42. Note that the sipe 45 extending from the terminating end of the first shoulder auxiliary groove 43 terminates inward in the tire width direction of the ground contact edge E.

In the example illustrated in the drawings, when forming the lug grooves (the central lug grooves 21, the intermediate lug grooves 31, and the shoulder lug grooves 41) in the land portions (the central land portion 20, the intermediate land portions 30, and the shoulder land portions 40) as described above, the lug grooves are configured such that the inclination directions of the lug grooves (the central lug grooves 21, the intermediate lug grooves 31, and the shoulder lug grooves 41) formed in adjacent land portions are opposite each other.

The structure of the tread pattern illustrated in FIG. 2 was described above. However, the present technology primarily specifies the structure of the region outward in the tire width direction from the ground contact edge E (described below). As such, provided that the tread pattern is partitioned by the outer main grooves 12 and the shoulder lug grooves 41 into shoulder blocks 42 as described above, the structure (tread pattern) of other portions within the ground contact region is not limited to the embodiment illustrated in FIG. 2.

Figure 3:
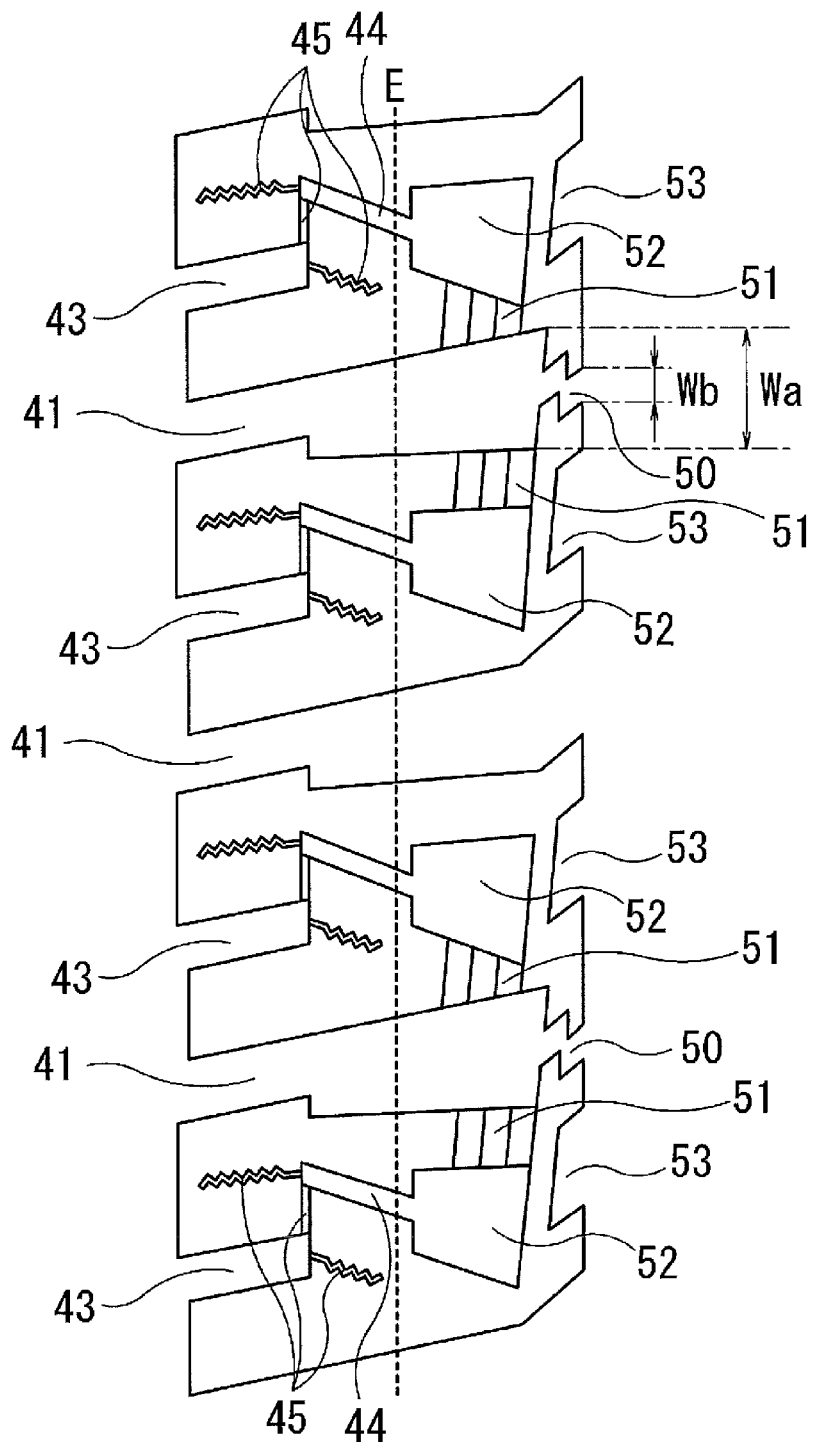
FIG. 3 is an enlarged front view illustrating a shoulder portion of a pneumatic tire according to the present technology.
Figure 4:
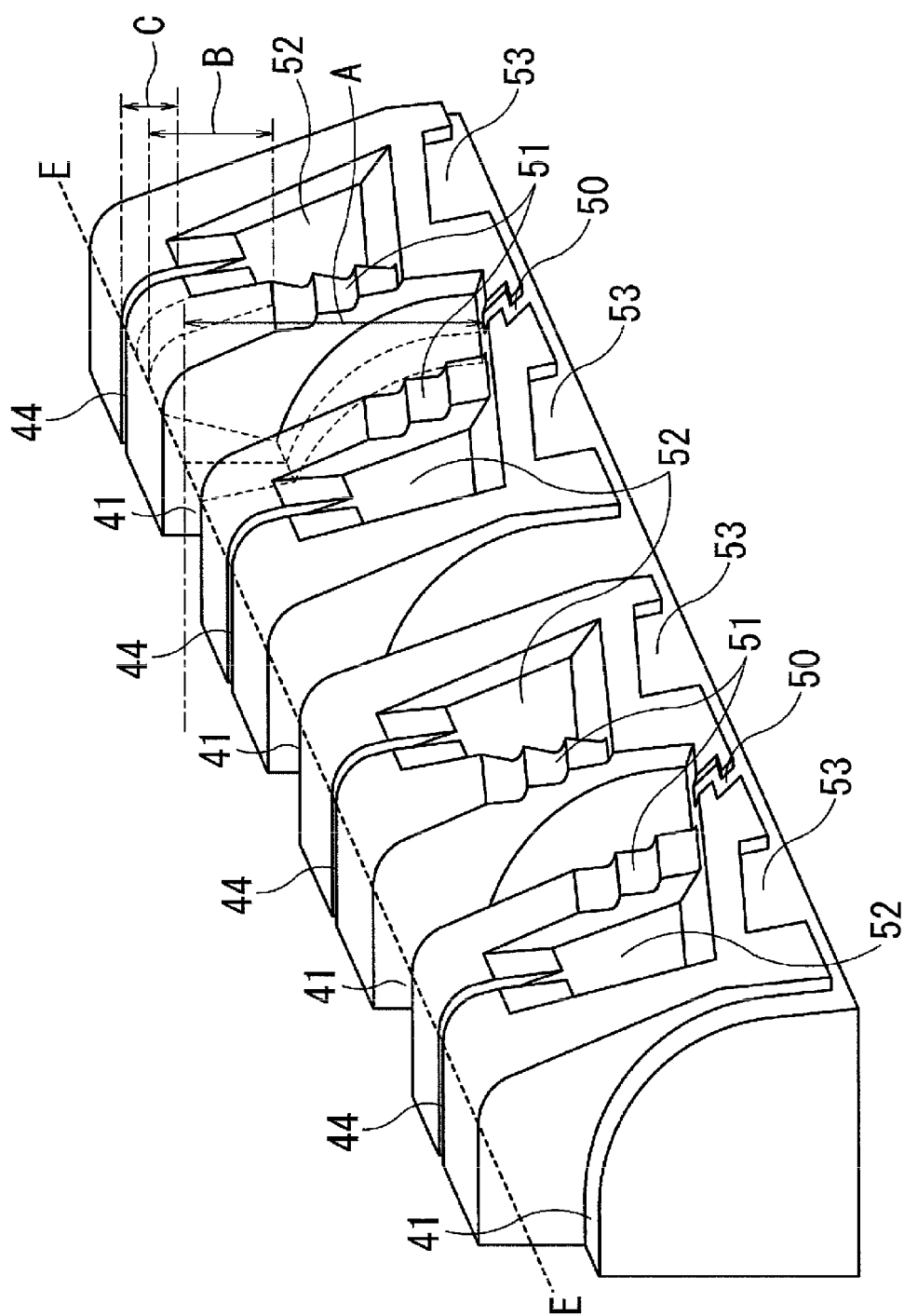
FIG. 4 is an enlarged perspective view illustrating a shoulder portion of a pneumatic tire according to the present technology.

As enlarged and illustrated in FIGS. 3 and 4, in the present technology, a narrow-width bent portion 50 is provided at an end portion outward in the tire width direction of at least a portion of the shoulder lug grooves 41. This narrow-width bent portion 50 has a groove width that is less than a groove width of other portions of the shoulder lug groove 41 that includes the narrow-width bent portion 50, and has a shape that is bent with respect to an extending direction of the shoulder lug groove 41. Particularly, in the embodiment illustrated in FIGS. 3 and 4, the narrow-width bent portion 50 has a zigzag shape, and is configured from a first portion extending in the tire circumferential direction, a second portion extending from a first end of the first portion toward the other portions of the shoulder lug groove 41 in the tire width direction, and a third portion extending from a second end of the first portion toward the tire width direction outer side in the tire width direction.

By providing the narrow-width bent portion 50 described above in the pneumatic tire of the present technology, not only is mud and the like bit into by the shoulder lug grooves 41 extending from the outer main grooves 12 and reaching the sidewall portions 2, but also discharging outward in the tire width direction of mud and the like that has gotten into the shoulder lug grooves 41 is suppressed by the narrow-width bent portion 50 provided at the end portion on the outer side in the tire width direction of at least a portion of the shoulder lug grooves 41. Thus, the mud and the like in the shoulder lug grooves 41 can be compacted more easily in the shoulder lug grooves 41. As a result, traction characteristics based on the shear force against compacted mud and the like can be satisfactorily obtained.

Particularly, due to the narrow-width bent portion 50 having a zigzag shape such as that illustrated in the drawings, mud and the like can be trapped by the portion that is bent in the zigzag shape, and this is advantageous from the perspective of improving traction characteristics.

Here, when viewing the shoulder lug groove 41 including the narrow-width bent portion 50 from the tire equator CL side outward in the tire width direction, it is preferable that a groove width ratio Wb/Wa is in a range of 0.15 to 0.50, where Wb is the groove width of the narrow-width bent portion 50 and Wa is the groove width of the shoulder lug groove 41 at a starting position of the narrow-width bent portion 50 (that is, the maximum groove width of a portion of the shoulder lug groove 41 including the narrow-width bent portion 50 where the groove width is not narrowed by the narrow-width bent portion 50). By configuring the groove width of the narrow-width bent portion 50 in this manner, discharging performance of mud and the like by the narrow-width bent portion 50 and traction characteristics based on shear force against compacted mud and the like can be achieved in a well-balanced manner. If the ratio Wb/Wa is less than 0.15, the shoulder lug groove 41 is substantially terminated and, as such, discharging performance of mud and the like will decline. If the ratio Wb/Wa exceeds 0.50, the discharge of mud and the like cannot be sufficiently suppressed and, as such, traction performance based on shear force against compacted mud and the like will not be sufficiently obtained. Note that, in the example illustrated in the drawings, the narrow-width bent portion 50 has a zigzag shape, but it is preferable that the groove width ratio described above is satisfied in all portions of the zigzag shape.

This narrow-width bent portion 50 is provided at the end portion outward in the tire width direction of the shoulder lug groove 41, but it is preferable that a ratio A/H of a vertical distance A measured along the tire radial direction from a ground contact edge E position of the tread portion 1 to the narrow-width bent portion 50, to a tire cross-sectional height H is from 0.15 to 0.30. By disposing the narrow-width bent portion 50 in this manner, the mud and the like on the road surface will reliably contact not only the portion up to the ground contact edge E of the shoulder lug grooves 41, but also will contact up to the narrow-width bent portion 50 when traveling on muddy ground (particularly deep muddy ground and the like) and the like. As such, the advantageous effects of the narrow-width bent portion can be excellently demonstrated.

Additionally, the advantageous effects described above can be obtained as long as the narrow-width bent portion 50 is provided on at least a portion of the shoulder lug grooves 41, and the narrow-width bent portion 50 may be provided on all of the shoulder lug grooves 41. However, as illustrated in the drawings, it is preferable that shoulder lug grooves 41 including the narrow-width bent portion 50 and shoulder lug grooves 41 not including the narrow-width bent portion 50 are alternately disposed along the tire circumferential direction. As a result of this configuration, shoulder lug grooves 41 (that do not include the narrow-width bent portion 50) that have sufficient groove width up to the end portion outward in the tire width direction and have excellent discharging performance of mud and the like, and shoulder lug grooves 41 (that include the narrow-width bent portion 50) that have slightly inferior discharging performance of mud and the like but have excellent traction characteristics based on shear force against compacted mud and the like can be disposed equally in the tire circumferential direction. As a result, these performance factors are achieved in a well-balanced manner and tire performance matching the situation when traveling can be effectively demonstrated.

In cases where providing the narrow-width bent portion 50 described above, it is preferable that an uneven portion 51 having a step-like shape is provided in a portion of the shoulder blocks 42 positioned on both sides in the tire circumferential direction of the shoulder lug groove 41 including the narrow-width bent portion 50, the uneven portion 51 undulating along a top surface of each shoulder block 42. By providing such an uneven portion 51, mud and the like that forms a clog in the shoulder lug grooves 41 can be effectively discharged via the uneven portion 51 during normal travel, and discharging performance of mud and the like can be improved. Additionally, when traveling on deep muddy ground and the like, the uneven portion 51 will bite into mud and the like, which is advantageous from the perspective of increasing traction characteristics.

Figure 5:
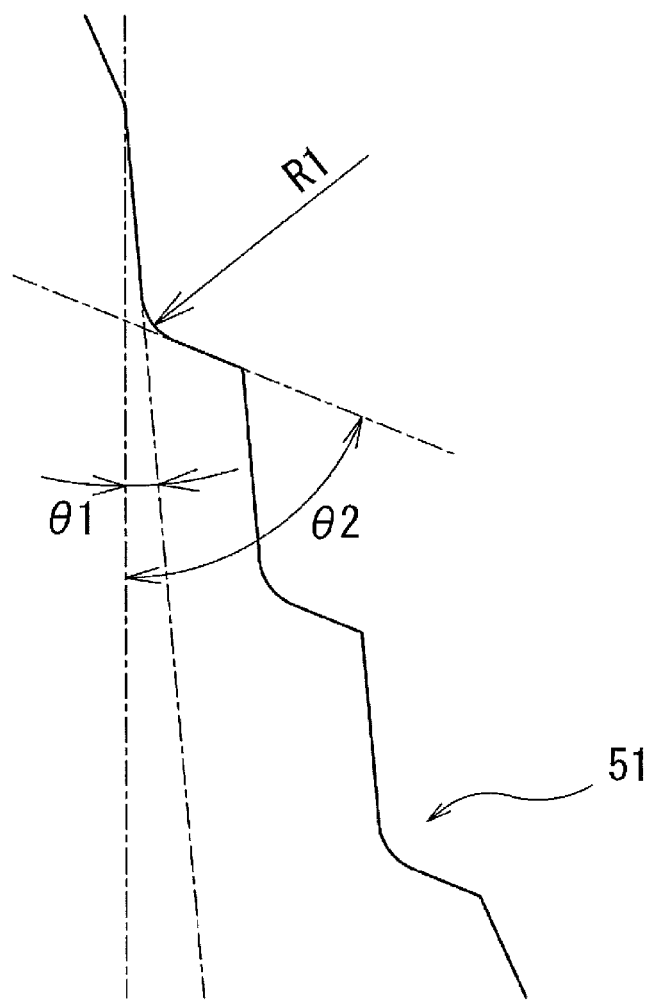
FIG. 5 is a meridian cross-sectional view explaining a shape of an uneven portion.

As enlarged and illustrated in FIG. 5, in a meridian cross section, the uneven portion 51 may include two inclined surfaces, namely a surface extending in substantially the tire radial direction and a surface extending in substantially the tire width direction, which are repeated in an alternating manner. When $\theta_1$ is an inclination angle of a first inclined surface with respect to the tire radial direction and $\theta_2$ is an inclination angle of a second inclined surface with respect to the tire radial direction, it is preferable that a relationship between these inclination angles $\theta_1$ and $\theta_2$ is such that $\theta_1 < \theta_2$ is satisfied. Here, the inclination angle $\theta_1$ is preferably, for example, from 5° to 30°, and the inclination angle $\theta_2$ is preferably, for example, from 65° to 85°. Additionally, in a meridian cross section, these two inclined surfaces are preferably connected to each other by a smooth arc, and a curvature radius R1 of this arc is preferably set to 2 mm to 5 mm.

It is preferable that this uneven portion 51 is provided so as to be adjacent to the shoulder lug groove 41 including the narrow-width bent portion 50. Specifically, when viewing this lug groove 41 outward in the tire width direction from the tire equator CL side, it is preferable that this uneven portion 51 is provided in portions of the blocks on both sides, at a front portion (that is, near the portion where the groove width of the narrow-width bent portion 50 is greatest) of the narrow-width bent portion 50. Disposing the uneven portion 51 near the portion where the groove width of the lug groove 41 is greatest is advantageous from the perspective of discharging mud and the like that forms a clog in the shoulder lug grooves 41 during normal travel.

It is more preferable that a ratio B/H of a vertical distance B measured along the tire radial direction from the ground contact edge E position of the tread portion 1 to the uneven portion 51, to the tire cross-sectional height H is in a range of 0.01 to 0.10. Note that a position outermost in the tire width direction of the uneven portion 51 may be set inward of the end portion on the tire equator side of the narrow-width bent portion 50. As such, a ratio of a vertical length measured along the tire radial direction from the ground contact edge E position of the tread portion 1 to the outermost point in the tire width direction on the uneven portion 51, to the tire cross-sectional height H is substantially the same range as the range of the ratio A/H described above.

As illustrated in FIGS. 3 and 4, in the present technology, it is preferable that at least one cavity 52 for which surroundings are obstructed is provided in the shoulder blocks 42. In the example illustrated in the drawings, the cavity 52 has a substantially trapezoidal shape. By providing such a cavity 52, mud and the like will be trapped by the cavity 52 and, also, the mud and the like gotten into the cavity 52 can be compacted. As such, traction characteristics can be further improved. Note that, in the example illustrated in the drawings, the second shoulder auxiliary groove 44 communicates with the cavity 52, but the groove width and groove depth of the second shoulder auxiliary groove 44 are sufficiently less than those of the lug grooves (the shoulder lug grooves 41). As such, the surroundings of the cavity 52 can be considered to be substantially obstructed.

A depth of this cavity 52 is not particularly limited, but if excessively deep, the rigidity of the shoulder blocks 42 will decline. As such, it is preferable that the depth of the cavity 52 be shallower than the depth at the same position in the tire width direction of the shoulder lug groove 41 adjacent in the tire circumferential direction to the cavity 52. Particularly, it is preferable that a maximum depth D1 of the cavity 52 is from 0.5 to 0.8 times a groove depth Da of the shoulder lug groove 41 at a position in the tire width direction where the cavity 52 is deepest. Here, if the maximum depth D1 of the cavity 52 is less than 0.5 times the groove depth Da at the position of the shoulder lug groove 41 described above, the cavity 52 will be excessively shallow and, as a result, mud and the like will not be sufficiently trapped and it will be more difficult to increase traction performance. If the maximum depth D1 of the cavity 52 is greater than 0.8 times the groove depth Da at the position of the shoulder lug groove 41 described above, the surroundings of the cavity 52 will be obstructed and the cavity 52 will be isolated from the other grooves. As a result, mud and the like will become a clog more easily.

It is preferable that the cavity 52 is disposed outward in the tire width direction from the ground contact edge E because the cavity 52 will effectively function when the tire enters mud and the like without affecting tire performance during normal travel. Particularly, it is preferable that a ratio C/H of a vertical distance C measured along the tire radial direction from the ground contact edge E position of the tread portion to the cavity 52, to the tire cross-sectional height H is in a range of 0.01 to 0.10. Disposing the cavity 52 at this position results in the cavity 52 reliably trapping mud and the like when traveling on muddy ground and the like, which is advantageous from the perspective of increasing traction characteristics. Here, if the ratio C/H is less than 0.01, the cavity 52 will be excessively close to the ground contact edge E and, as a result, rigidity of the portion of the shoulder block 42 within the ground contact region will decline. If the ratio C/H exceeds 0.10, the cavity 52 will be excessively far from the ground contact edge E and, as a result, the advantageous effects of the cavity 52 may not be sufficiently obtained.

Note that, in the example illustrated in the drawings, a recessed portion 53 recessed to the tire equator CL side is formed in the wall surface outward in the tire width direction of the shoulder block 42. This recessed portion 53 is disposed on both sides in the tire circumferential direction of the narrow-width bent portion 50, and is disposed outward in the tire width direction of each cavity 52. Disposing the recessed portion 53 in this manner results in an increase in the edge components of the shoulder blocks 42, which is advantageous from the perspective of easily trapping mud and the like and increasing traction characteristics.

The description given above focused on mud performance when traveling on muddy ground and the like as an advantageous effect of the present technology. However, the same actions will be demonstrated for snow when traveling on snowy roads (instead of mud on muddy ground), and driving performance (snow performance) on snow-covered road surfaces can be obtained.

EXAMPLES

Eleven types of pneumatic tires for Conventional Example 1, Comparative Example 1, and Examples 1 to 9 were fabricated. For each pneumatic tire, the tire size was 265/65R17 112H and the tread pattern within the ground contact region included the structure illustrated in FIG. 2. The presence/absence of the narrow-width bent portion; the shape of the narrow-width bent portion; the disposal of the narrow-width bent portion; the ratio Wb/Wa of the groove width Wb of the narrow-width bent portion to the maximum groove width Wa at the portion of the shoulder lug grooves 41 including the narrow-width bent portion where the groove width is not narrowed by the narrow-width bent portion; the ratio A/H of the vertical distance A measured along the tire radial direction from the ground contact edge position to the narrow-width bent portion, to the tire cross-sectional height H; the presence/absence of the uneven portion; and the presence/absence of the cavity were configured as shown in Table 1.

Note that Conventional Example 1 is an example in which all of the shoulder lug grooves did not include the narrow-width bent portion, all of the shoulder lug grooves extended outward in the tire width direction and reached the sidewall portion, and the groove width of each shoulder lug groove gradually increased outward in the tire width direction. Comparative Example 1 is an example in which, instead of the narrow-width bent portion, a portion was provided at the end portion outward in the tire width direction of a portion of the shoulder lug grooves, this portion having a groove width smaller than that of other portions of these shoulder lug grooves and extending in the extending direction of these shoulder lug grooves. While this is also an example where the narrow-width bent portion is not provided, for convenience, the portion where the groove width is narrowed is considered to be a narrow-width bent portion, and the shape thereof is considered to be a straight line. This configuration can be seen in Table 1.

Additionally, in the examples including the uneven portion (Conventional Example 1, Comparative Example 1, Examples 1 to 7 and 9), a common configuration was used in which the shape of the uneven portion was the shape illustrated in FIG. 5, the inclination angle θ1 and inclination angle θ2 of the two inclined surfaces constituting the uneven portion were 5° and 80°, respectively, and the curvature radius R1 of the arc connecting these inclined surfaces was 2 mm. Additionally, the uneven portion was disposed as illustrated in FIGS. 2 to 4, and a common configuration was used in which the ratio B/H of the vertical distance B measured along the tire radial direction from the ground contact edge position to the uneven portion, to the tire cross-sectional height H was 0.08 mm. On the other hand, in Example 8 that did not include the uneven portion, the top surface of the portions of the shoulder blocks positioned on both sides in the tire circumferential direction of the shoulder lug grooves that included the narrow-width bent portion was smooth, similar to the top surface of the portions of the shoulder blocks positioned on both side in the tire circumferential direction of the shoulder lug groove that did not include the narrow-width bent portion.

Additionally, in the examples including the cavity (Conventional Example 1, Comparative Example 1, Examples 1 to 8), the shape and disposal of the cavity were those illustrated in FIG. 4; and a common configuration was used in which the ratio D1/Da of the maximum depth D1 of the cavity to the groove depth Da of the shoulder lug groove at the position in the tire width direction where the cavity is deepest was 0.75; and the ratio C/H of the vertical distance C measured along the tire radial direction from the ground contact edge position to the cavity, to the tire cross-sectional height H was 0.05. On the other hand, in Example 9 that did not include the cavity, the second shoulder auxiliary groove was extended to the end portion of the shoulder block.

For the "Disposal of narrow-width bent portion" row in Table 1, cases in which shoulder lug grooves including the narrow-width bent portion and shoulder lug grooves not including the narrow-width bent portion were alternately disposed throughout the entire circumference of the tire were indicated as "Alternating"; cases where shoulder lug grooves including the narrow-width bent portion and shoulder lug grooves not including the narrow-width bent portion were randomly disposed and including portions where shoulder lug grooves including the narrow-width bent portion were adjacent and portions where shoulder lug grooves not including the narrow-width bent portion were adjacent were indicated as "Random"; and cases where all of the shoulder lug grooves included the narrow-width bent portion were indicated as "All grooves".

These 11 types of pneumatic tires were evaluated for mud ride feeling and take off performance on deep muddy road surfaces by the evaluation methods described below, and the results are also shown in Table 1.

Mud Ride Feeling

Each test tire was mounted on a wheel with a rim size of 17×8J, inflated to an air pressure of 230 kPa, and mounted on a four-wheel drive vehicle with an engine displacement of 3.5 L. Then, test driving was carried out by a test driver on a mud course (mud depth: from 10 mm to 20 mm), and driving performance at this time was sensory evaluated. Evaluation results were expressed as index values, with Conventional Example 1 being assigned a reference index value of 100. Larger index values indicate superior mud ride feeling.

Take Off Performance on Deep Muddy Road Surfaces

Each test tire was mounted on a wheel with a rim size of 17×8J, inflated to an air pressure of 230 kPa, and mounted on a four-wheel drive vehicle with an engine displacement of 3.5 L. Then, test driving was carried out by a test driver on a deep muddy road surface (mud depth: from 100 mm to 200 mm), and take off performance at this time was sensory evaluated. Evaluation results were expressed as index values, with Conventional Example 1 being assigned an index value of 100. Larger index values indicate superior take off performance on deep muddy road surfaces.

TABLE 1

|  |  | Conventional example 1 | Comparative example 1 | Example 1 | Example 2 | Example 3 |
|---|---|---|---|---|---|---|
| Presence/absence of narrow-width bent portion | | Absent | Present | Present | Present | Present |
| Shape of narrow-width bent portion | | — | Straight line | Zigzag | Zigzag | Zigzag |
| Disposal of narrow-width bent portion | | — | Alternating | Alternating | Random | All grooves |
| Ratio Wb/Wa | | — | 0.40 | 0.40 | 0.40 | 0.40 |
| Ratio A/H | | — | 0.20 | 0.20 | 0.20 | 0.20 |
| Presence/absence of uneven portion | | Present | Present | Present | Present | Present |
| Presence/absence of cavity | | Present | Present | Present | Present | Present |
| Mud ride feeling | Index value | 100 | 100 | 100 | 98 | 98 |
| Take off performance on deep muddy road surfaces | Index value | 100 | 110 | 120 | 118 | 125 |

|  | Example 4 | Example 5 | Example 6 | Example 7 | Example 8 | Example 9 |
|---|---|---|---|---|---|---|
| Presence/absence of narrow-width bent portion | Present | Present | Present | Present | Present | Present |

TABLE 1-continued

| Shape of narrow-width bent portion | | Zigzag | Zigzag | Zigzag | Zigzag | Zigzag | Zigzag |
|---|---|---|---|---|---|---|---|
| Disposal of narrow-width bent portion | | Alternating | Alternating | Alternating | Alternating | Alternating | Alternating |
| Ratio Wb/Wa | | 0.15 | 0.50 | 0.40 | 0.40 | 0.40 | 0.40 |
| Ratio A/H | | 0.20 | 0.20 | 0.10 | 0.30 | 0.20 | 0.20 |
| Presence/absence of uneven portion | | Present | Present | Present | Present | Absent | Present |
| Presence/absence of cavity | | Present | Present | Present | Present | Present | Absent |
| Mud ride feeling | Index value | 98 | 99 | 100 | 99 | 100 | 100 |
| Take off performance on deep muddy road surfaces | Index value | 125 | 122 | 118 | 118 | 115 | 115 |

As clear from Table 1, mud ride feeling and take off performance on deep muddy road surfaces improved in each of Examples 1 to 9 compared to Conventional Example 1. On the other hand, in Comparative Example 1, the portion having a groove width smaller than that of the other portions of the shoulder lug groove, and that extends in the extending direction of the shoulder lug groove was provided instead of the narrow-width bent portion. As such, the discharge of mud by this portion was not sufficiently suppressed, the mud gotten into the shoulder lug grooves was not sufficiently compacted, and traction characteristics was not sufficiently obtained. Consequently, take off performance in deep muddy road surfaces declined.

The invention claimed is:

1. A pneumatic tire, comprising:
a tread portion extending in a tire circumferential direction to form an annular shape;
a pair of sidewall portions disposed on both sides of the tread portion;
a pair of bead portions disposed inward in a tire radial direction of the sidewall portions;
main grooves disposed in shoulder regions of the tread portion and extending in the tire circumferential direction;
a plurality of lug grooves extending outward in a tire width direction from the main grooves and reaching the sidewall portions; and
a plurality of blocks partitioned by the main grooves and the lug grooves; wherein
a narrow-width bent portion, having a groove width less than a groove width of other portions of the lug groove and which is bent with respect to an extending direction of the lug groove, is provided at an end portion outward in the tire width direction of at least a portion of lug grooves among the plurality of lug grooves, the narrow width bent portion including multiple bends in different directions; and
the lug grooves including the narrow-width bent portion and lug grooves not including the narrow-width bent portion are alternately disposed along the tire circumferential direction.

2. The pneumatic tire according to claim 1, wherein:
an uneven portion having a step-like shape is provided in a portion of blocks positioned on both sides in the tire circumferential direction of the lug grooves including the narrow-width bent portion, the uneven portion undulating along a top surface of each of the blocks.

3. The pneumatic tire according to claim 2, wherein:
when viewing the lug groove including the narrow-width bent portion from a tire equator side, a ratio Wb/Wa of a groove width Wb of the narrow-width bent portion to a groove width Wa of the lug groove at a starting position of the narrow-width bent portion is from 0.15 to 0.50.

4. The pneumatic tire according to claim 3, wherein:
a ratio A/H of a vertical distance A measured along the tire radial direction from a ground contact edge position of the tread portion to the narrow-width bent portion, to a tire cross-sectional height H is from 0.15 to 0.30.

5. The pneumatic tire according to claim 4, wherein:
at least one cavity for which surroundings are obstructed is provided in the blocks.

6. The pneumatic tire according to claim 1, wherein:
when viewing the lug groove including the narrow-width bent portion from a tire equator side, a ratio Wb/Wa of a groove width Wb of the narrow-width bent portion to a groove width Wa of the lug groove at a starting position of the narrow-width bent portion is from 0.15 to 0.50.

7. The pneumatic tire according to claim 1, wherein:
a ratio A/H of a vertical distance A measured along the tire radial direction from a ground contact edge position of the tread portion to the narrow-width bent portion, to a tire cross-sectional height H is from 0.15 to 0.30.

8. The pneumatic tire according to claim 1, wherein:
at least one cavity for which surroundings are obstructed is provided in the blocks.

* * * * *